(12) United States Patent
Kinnard et al.

(10) Patent No.: US 7,030,771 B2
(45) Date of Patent: Apr. 18, 2006

(54) SYSTEM AND METHOD TO PROVIDE HOT-SWAP STATUS INDICATION IN A COMPUTER SYSTEM HAVING REDUNDANT POWER SUPPLIES

(75) Inventors: Jay R. Kinnard, Austin, TX (US); Rhod J. Jones, Crowthorne (GB)

(73) Assignee: Sun Microsystems, Inc., Santa Clara, CA (US)

( * ) Notice: Subject to any disclaimer, the term of this patent is extended or adjusted under 35 U.S.C. 154(b) by 213 days.

(21) Appl. No.: 10/386,836

(22) Filed: Mar. 12, 2003

(65) Prior Publication Data

US 2004/0179334 A1 Sep. 16, 2004

(51) Int. Cl.
*G08B 21/00* (2006.01)

(52) U.S. Cl. .................. 340/653; 340/636.1; 340/657; 307/65

(58) Field of Classification Search ............... 340/653, 340/636.1–637, 693.1–693.4; 307/18–29
See application file for complete search history.

(56) References Cited

U.S. PATENT DOCUMENTS

| | | | | |
|---|---|---|---|---|
| 4,381,457 A | * | 4/1983 | Wiles ........................... 307/64 |
| 5,300,874 A | * | 4/1994 | Shimamoto et al. ......... 320/106 |
| 5,316,868 A | * | 5/1994 | Dougherty et al. ............ 429/9 |
| 5,549,984 A | * | 8/1996 | Dougherty .................... 429/61 |
| 5,610,497 A | * | 3/1997 | Croughwell ................. 307/70 |
| 5,739,596 A | * | 4/1998 | Takizawa et al. ............. 307/66 |
| 5,861,898 A | * | 1/1999 | Nakanishi .................... 347/19 |
| 5,874,823 A | * | 2/1999 | Suzuki ........................ 320/125 |
| 5,894,413 A | * | 4/1999 | Ferguson ..................... 363/65 |
| 5,978,236 A | | 11/1999 | Faberman et al. |
| 6,202,171 B1 | * | 3/2001 | Townsley et al. ............. 714/14 |
| 6,421,215 B1 | | 7/2002 | Bushue |
| 6,501,660 B1 | | 12/2002 | Ho et al. |
| 6,781,570 B1 | * | 8/2004 | Arrigo et al. ................ 345/158 |
| 6,853,551 B1 | | 2/2005 | Baar et al. |

* cited by examiner

*Primary Examiner*—Thomas J. Mullen, Jr.
*Assistant Examiner*—Son Tang
(74) *Attorney, Agent, or Firm*—Meyertons Hood Kivlin Kowert & Goetzel, P.C.; B. Noël Kivlin

(57) ABSTRACT

A system and method for providing hot-swap status indication in a computer system having redundant power supplies. In one embodiment a system comprises an electrical subsystem that is powered by a first power supply and second power supply. The system further comprises a hot-swap indicator configured to provide a first user indication to indicate whether the first power supply is hot-swappable depending on whether the first power supply is operating at greater than a predetermined power capacity usage, such as fifty percent. The system may also include a second hot-swap indicator for the second power supply.

21 Claims, 3 Drawing Sheets

SYSTEM AND METHOD TO PROVIDE HOT-SWAP STATUS INDICATION IN A COMPUTER SYSTEM HAVING REDUNDANT POWER SUPPLIES

BACKGROUND OF THE INVENTION

1. Field of the Invention

This invention relates to the field of computer system power supplies and, more particularly, to a system and method for providing hot-swap status indication in a computer system having redundant power supplies.

2. Description of the Related Art

To maximize return on investment in computer systems and provide reliable service to system users, computers must be designed with the goal of minimum system downtime and maximum system availability. Because the failure of key components can lead to a loss of system availability, many key components, such as power supplies, are designed to provide redundant capacity and thus still provide for normal operation of the system even in the event of a component failure.

For example, a redundant power supply may include two separate power supplies, each capable of powering the system individually. Under normal operation, both power supplies are operable to share the power load, with each power supply operable to provide half the required power. However, in the event of failure or removal of one of the power supplies, the other power supply is operable to provide full power to the system.

To further minimize system downtime, key components in the computer system may be designed to be hot-swappable. Hot-swapping is a method for removing or replacing a component of a computer system without shutting down or restarting the system, thereby providing system availability even as the system is being serviced or repaired. In a system that provides hot-swappable redundant power supplies, one of the power supplies may be removed and serviced while the remaining power supply continues to power the system.

In some systems that provide redundant power supplies, the output voltage of each supply may be monitored to provide an indication that each power supply is providing sufficient voltage, and thus that one of the power supplies may be hot-swapped. However, in some instances even a power supply which provides a voltage within the desired specification may not be providing sufficient power to allow for the removal of the other power supply.

Furthermore, it may be at times desirable to add additional components to the computer system to provide new capabilities or enhanced functionality. However, the addition of these components may increase the system power load such that neither individual power supply has sufficient capacity to fully power the system. In such situations, a user may detrimentally attempt to hot-swap a power supply.

SUMMARY OF THE INVENTION

A system and method for providing hot-swap status indication in a computer system having redundant power supplies are disclosed. In one embodiment a system comprises an electrical subsystem that is powered by a first power supply and second power supply. The system further comprises a hot-swap indicator configured to provide a first user indication to indicate whether the first power supply is hot-swappable depending on whether the first power supply is operating at greater than a predetermined power capacity usage, such as fifty percent. The system may also include a second hot-swap indicator for the second power supply.

Figure 1:
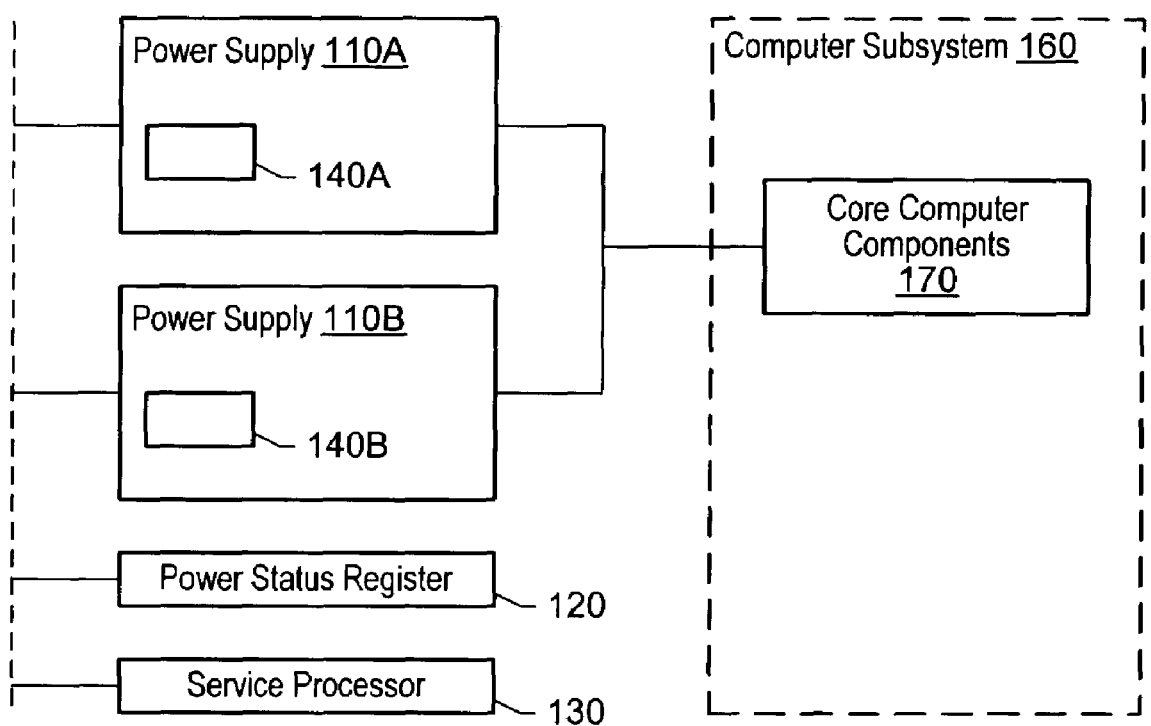
FIG. 1 is a block diagram of one embodiment of a computer system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Turning now to FIG. 1, a block diagram of one embodiment of a computer system is shown. Power supplies 110A and 110B are coupled to a computer subsystem 160, which draws power from the power supplies as described below. Computer subsystem 160 is illustratively shown with core computer system components 170, which may include a variety of standard computer components such as one or more processors and a main memory. Core computer system components 170 may additionally include other basic computer components as desired, such as an I/O interface, a network interface, or other peripherals. Computer subsystem 160 may embody a desktop, laptop, workstation, server node, or any other form of computational device.

In the configuration of FIG. 1, during normal operation, power supplies 110A and 110B are operable to equally share the power load of computer subsystem 160. Each power supply is further operable to provide full power to computer subsystem 160 upon failure or removal of the other power supply. In combination, power supplies 110A and 110B thus form a redundant power supply configuration, with each individual power supply being "hot-swappable", i.e. individually removable or replaceable without interfering with the operations of computer system 160.

Power supplies 110A and 110B are shown coupled to a power status register 120 and a service processor 130 through a communication bus 150. Hot-swap indicators 140A and 140B are shown associated with power supplies 110A and 110B, respectively.

As will be described further below, in one embodiment power status register 120 is operable to store one or more values indicative of whether each of the power supplies 110A and 110B is operating at greater than fifty percent of its respective total power capacity. Power supplies 110A and 110B may include an interface to communications bus 150 to allow periodic updates of the values stored in power status register 120. In one embodiment, communication bus 150 is a serial bus, such as an I2C (I squared C) bus.

Service processor 130 is operable to read the values stored in power status register 120 to determine the current power capacity usage of power supplies 110A and 110B respectively. Based on the stored values, service processor 130 is further operable to control hot-swap indicators 140A and 140B. As will be described below, hot swap indicators 140A and 140B provide user indications to indicate whether power supplies 110A and 110B, respectively, can currently be hot-swapped. In one embodiment, hot-swap indicators 140A and 140B may be light emitting diodes (LEDs) that provide visual indications to the user to indicate the hot-swap status of power supplies 110A and 110B.

Figure 2:
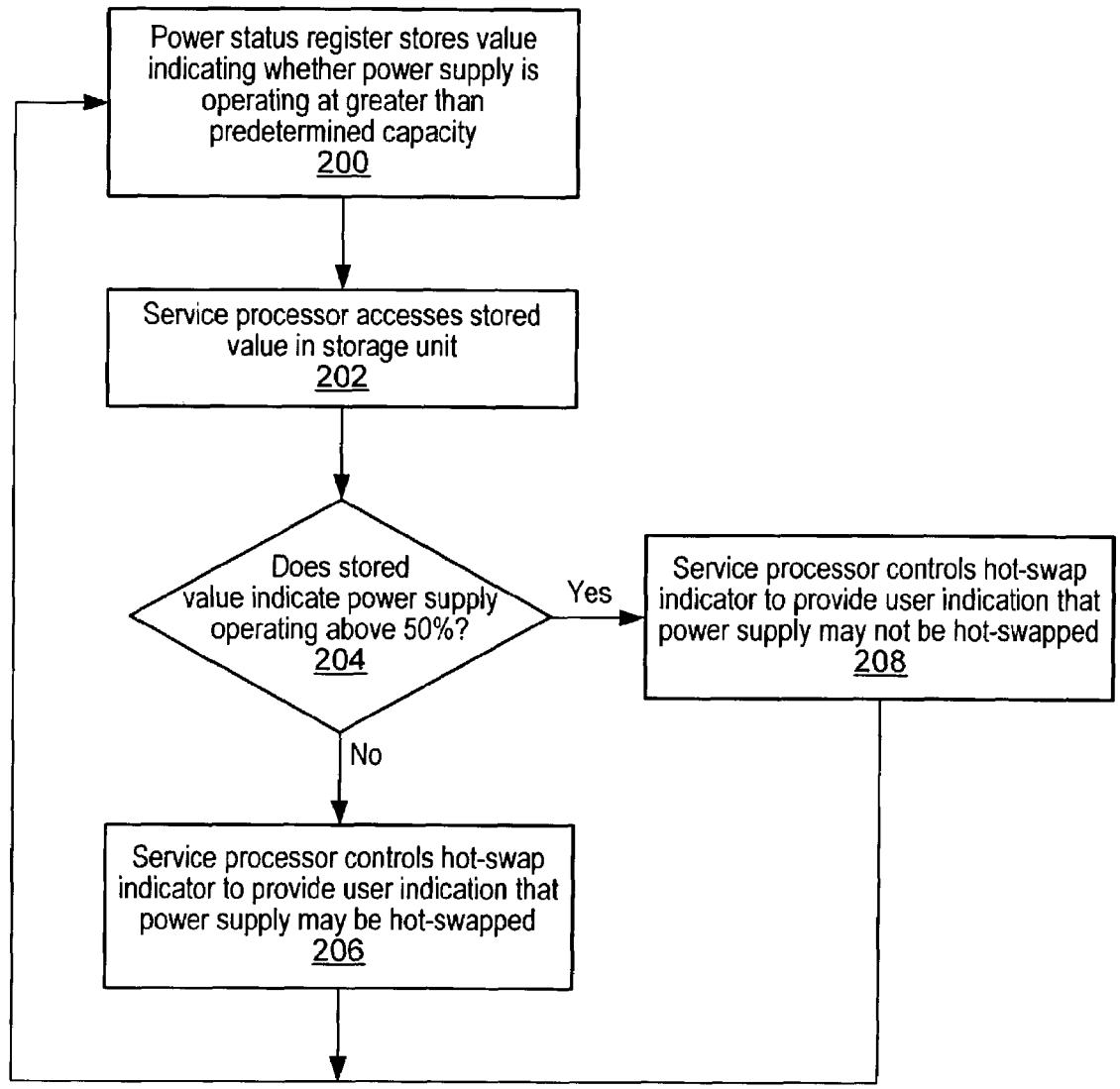
FIG. 2 is a flow chart that illustrates a method for the operation of a redundant power system.

FIG. 2 illustrates one embodiment of a method of operation of the redundant power system shown in FIG. 1. In step 200, power status register 120 stores one or more values indicating whether each of power supplies 110A and 110B is operating at greater than fifty percent of its total power capacity. A pair of bits within power status register 120 may be used for this purpose, each corresponding to a respective one of power supplies 110A and 110B and being set or cleared depending upon whether the power supply is operating at greater than fifty percent of its total power capacity.

In step 202 service processor 130 accesses the stored values in power status register 120 through communication bus 150. If power supplies 110A and 110B are not operating at greater than the predetermined power capacity usage, the service processor causes hot-swap indicators 140A–B to provide a user indication that the power supplies may be hot-swapped in step 206. In one implementation, this user indication may be made by turning on light-emitting diodes (LEDs) that embody the hot-swap indicators In one embodiment, each hot swap indicator 140 may only depend on the power capacity usage of the associated power supply. In an alternative embodiment, a hot-swap indicator 140 may provide the user indication that the corresponding power supply may be hot-swapped only if both of the power supplies are operating at less than fifty percent of their total power capacity.

Alternatively, if power supplies 110A and 110B are operating at greater than the predetermined power capacity usage, service processor 130 controls hot-swap indicators 140A and 140B in step 208 to provide a user indication that the associated power supplies may not be hot-swapped.

Thus in the configuration of FIG. 1, if each power supply 110 is operating as designed, each power supply 110 will share the power load of computer subsystem 160 equally while remaining under fifty percent of total power capacity. Therefore, in accordance with the above description, each hot-swap indicator will provide a user indication that the respective power supply is hot-swappable, since either power supply is capable of individually providing full power to the computer subsystem.

Alternatively, if, for example, power supply 110A is not operating as designed and fails to provide an equal share of power, the other power supply 110B may be operating beyond fifty percent of its power capacity. Thus, in accordance with the method depicted in FIG. 2, hot-swap indicator 140A is controlled to provide a user indication that power supply 110A may be hot-swapped, while hot-swap indicator 140B is controlled to provide a user indication that power supply 110B is not hot-swappable.

Figure 3:
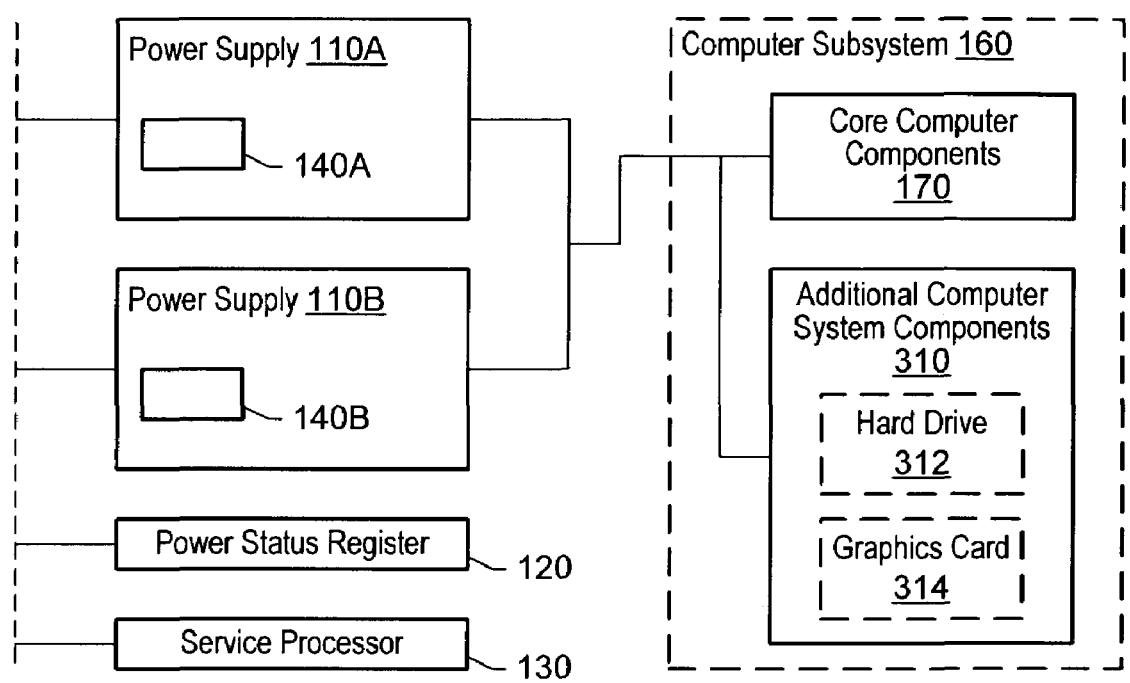
FIG. 3 is a block diagram of an alternate embodiment of a computer system.

As illustrated in FIG. 3, it may be desirable to add additional computer system components 310 to computer subsystem 160 to provide additional capabilities or enhanced functionality. The additional computer system components 310 may be any type of component, such as, for example, a hard drive 312, graphics card 314, and so on.

It is possible that the altered configuration of the computer subsystem as depicted in FIG. 3, including the additional computer system components 310, may require a total amount of power that exceeds the individual capacity of either of the power supplies 110A and 110B. The altered configuration thus eliminates the redundant aspects and hot-swap capabilities of the power supplies. In other words, the configuration of FIG. 3 may require that each of the power supplies operate at greater than fifty percent capacity, thereby requiring that both power supplies be installed and functioning to properly power computer subsystem 160.

Accordingly, referring back to FIG. 2, during operation of the computer system configuration of FIG. 3, the values stored in power status register 120 may indicate that both power supplies 110A and 110B are operating at greater than fifty percent of their capacity. Thus, in step 208, service processor 130 causes hot swap indicators 140A and 140B to provide a user indication that neither power supply 110A and 110B may be hot-swapped. In this manner, user confusion relating to whether a particular power supply may be hot-swapped may be eliminated.

It is noted that numerous alternative implementations are possible. For example, while in the embodiment described above the hot-swap indicators 140A and 140B are implemented using LEDs that are selectively turned on or off, other visual user indications may be provided. For example, in one alternate embodiment, hot-swap indicators that change colors depending upon the hot-swap status of a power supply may be used. Still further, text or other displays on a monitor may be used to implement the hot-swap indications.

It is also contemplated that, in alternate embodiments, hot-swap indicators 140A and 140B may be replaced by a single indicator. Such an indicator may be operable to indicate whether either power supply is individually hot-swappable, depending upon whether either of the power supplies is operating at greater than fifty percent of its power capacity.

It is additionally noted that in various embodiments, the predetermined power capacity usage used to determine whether a hot-swap indication should be provided may be a value other than fifty percent. For example, depending upon tolerances and/or other factors, the predetermined power capacity usage may be selected at another value of approximately fifty percent, such as forty-seven percent.

In another embodiment, more than two individual power supplies may be provided, wherein a subset is capable of individually powering the associated computer system. In such embodiments, predetermined power capacity usage values other than fifty percent of total capacity may be used to determine whether a hot-swap indication should be provided. The state of a hot-swap indicator corresponding to a particular power supply in such embodiments may therefore be dependent on whether any (or a subset) of the power supplies are operating at greater than the predetermined power capacity.

Still further, while in the above embodiments a power status register 120 is provided to store indications of the current power capacity usage of power supplies 110A and 110B, other storage devices may alternatively be employed. In addition, embodiments are possible in which the power supplies 110A and 110B provide signals (e.g. digital or analog) indicative of whether the power supplies are operating beyond a predetermined power capacity. In such an embodiment, the service processor 120 or other control mechanism may selectively control the hot-swap indications based on the signals.

Finally, while in the embodiment described above the power supplies are coupled to provide power to computer subsystem 160, other embodiments are possible in which the power supplies provide power to any other form of electrical system.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
an electrical subsystem;
a first power supply;
a second power supply, wherein the first and second power supplies are coupled to provide power to the electrical subsystem;
a first hot-swap indicator configured to provide a first user indication to selectively indicate whether the first power supply is hot-swappable depending on whether the first power supply is operating at greater than a predetermined amount of its power capacity.

2. The system of claim 1 further comprising a storage unit configured to store a value indicative of whether the first power supply is operating at greater than the predetermined amount of its power capacity.

3. The system of claim 2 wherein the first user indication is dependent on the value stored in the storage unit.

4. The system of claim 2 wherein the storage unit is a register.

5. The system of claim 2 further comprising a service processor coupled to the storage unit and the first hot-swap indicator, wherein the service processor is operable to access the value stored in the storage unit and to control the first hot-swap indicator to provide the first user.

6. The system of claim 1 wherein the first user indication provided by the first hot-swap indicator is further dependent upon whether the second power supply is operating at greater than a predetermined power capacity.

7. The system of claim 2 further comprising a second hot-swap indicator configured to provide a second user indication to indicate whether the second power supply is hot-swappable depending on whether the second power supply is operating at greater than a predetermined power capacity.

8. The system of claim 7 wherein the storage unit is further configured to store a second value indicative of whether the second power supply is operating at greater than a predetermined power capacity.

9. The system of claim 8 wherein the second user indication is dependent upon the second value stored in the storage unit.

10. The system of claim 9, wherein the predetermined amount of the power capacity of the first power supply is approximately fifty percent.

11. The system of claim 1, wherein the predetermined amount of the power capacity of the first power supply is approximately fifty percent.

12. The system of claim 1, wherein the first hot-swap indicator is a visual indication.

13. The system of claim 12, wherein the first hot-swap indicator is a light emitting diode (LED).

14. The system of claim 12, wherein the first hot-swap indicator is an indication on a monitor.

15. A method for operating a system comprising:
first and second power supplies providing power to the system;
determining whether the first power supply is operating at greater than a predetermined amount of its power capacity;
selectively providing a first user indication that the first power supply is hot-swappable depending upon whether the first power supply is operating at greater than the predetermined amount of its power capacity.

16. The method of claim 15 further comprising:
determining whether the second power supply is operating at greater than a predetermined amount of its power capacity;
selectively providing a second user indication that the second power supply is hot-swappable depending upon whether the second power supply is operating at greater than the predetermined amount of its power capacity.

17. The method of claim 15 further comprising:
adding additional components to the system;
determining that the first power supply is operating at greater than the predetermined amount of its power capacity and that the second power supply is operating at greater than the predetermined amount of its power capacity; and
responsively changing the states of the first and second user indications to indicate that neither the first power supply nor the second power supply is hot-swappable.

18. The method of claim 17, wherein the predetermined amount of the power capacity of the first power supply is approximately fifty percent.

19. The method of claim 15, wherein the predetermined amount of the power capacity of the first power supply is approximately fifty percent.

20. The method of claim 15 further comprising storing a value in a storage unit indicative of whether the first power supply is operating at greater than the predetermined amount of its power capacity.

21. The method of claim 20 wherein the storage unit is a register.

* * * * *

UNITED STATES PATENT AND TRADEMARK OFFICE
CERTIFICATE OF CORRECTION

PATENT NO. : 7,030,771 B2  Page 1 of 1
APPLICATION NO. : 10/386836
DATED : April 18, 2006
INVENTOR(S) : Kinnard et al.

It is certified that error appears in the above-identified patent and that said Letters Patent is hereby corrected as shown below:

Column 5,

Line 35, please delete "hot-swap indicator configured to provide a second user" and substitute -- hot-swap indicator configured to selectively provide a second user --

Lines 38-39, please delete "predetermined power capacity" and substitute -- predetermined amount of its power capacity --

Line 43, please delete "predetermined power capacity" and substitute -- predetermined amount of its power capacity --

Signed and Sealed this

Twenty-ninth Day of July, 2008

JON W. DUDAS
*Director of the United States Patent and Trademark Office*